United States Patent [19]
Trapp et al.

[11] Patent Number: 5,930,910
[45] Date of Patent: Aug. 3, 1999

[54] PURGE TUBE WITH FLAPPER VALVE FOR DESICCANT CONTAINING AIR DRIER

[75] Inventors: Scott M. Trapp, Charlotte, N.C.; Michael V. Kazakis, Simpsonville, S.C.

[73] Assignee: Westinghouse Air Brake Company, Wilmerding, Pa.

[21] Appl. No.: 08/979,197

[22] Filed: Nov. 26, 1997

[51] Int. Cl.⁶ ................................. F26B 21/06
[52] U.S. Cl. ................................................ 34/80
[58] Field of Search .................. 34/80, 81, 82; 55/337, 413, 424, 426, 432; 96/134, 137, 209; 417/279

[56] References Cited

U.S. PATENT DOCUMENTS

| | | | |
|---|---|---|---|
| 3,592,563 | 7/1971 | Glass et al. | 137/596.2 X |
| 3,877,904 | 4/1975 | Lowrie | 55/426 X |
| 4,149,861 | 4/1979 | Sogo et al. | 55/426 X |
| 4,247,311 | 1/1981 | Seibert et al. | 96/111 |
| 4,525,183 | 6/1985 | Cordes et al. | 137/543.15 |
| 4,853,010 | 8/1989 | Spence et al. | 55/426 X |
| 5,604,991 | 2/1997 | Castle et al. | 34/80 |
| 5,662,727 | 9/1997 | Castle et al. | 34/80 X |
| 5,685,896 | 11/1997 | Castle et al. | 34/80 X |

*Primary Examiner*—Henry Bennett
*Assistant Examiner*—Steve Gravini
*Attorney, Agent, or Firm*—James Ray & Associates

[57] ABSTRACT

A desiccant media containing cartridge for use in a gas drying apparatus adapted to firstly function in a gas drying cycle in which a moist gas is permitted to pass upwardly through said desiccant media whereby at least a portion of the moisture is removed from said gas, and adapted to secondly function in a desiccant media purge cycle in which a portion of said dried gas is allowed to pass back downwardly through said desiccant media to absorb moisture therefrom thereby at least partially regenerating said desiccant media, including a means for concentrating the desiccant purge cycle at the bottom of the desiccant media, which means comprise a purge tube extending vertically partially through the desiccant media, and a flapper valve adjacent to an upper end of the purge tube adapted to close and restrict flow of gas through the purge tube when the gas is flowing upwardly in during the gas drying cycle and to open and promote gas flow through the purge tube when the gas is flowing downwardly during the desiccant purge cycle.

20 Claims, 3 Drawing Sheets

PURGE TUBE WITH FLAPPER VALVE FOR DESICCANT CONTAINING AIR DRIER

CROSS REFERENCE TO RELATED APPLICATIONS

The invention taught in this patent application is closely related to the inventions taught in U.S. Pat. No. 5,423,129, and to pending patent applications Ser. Nos. 08/597,262 and 08/597,261 both filed Feb. 6, 1996, and respectively titled "Switching and Purging Mechanism For-A Twin Tower Air Dryer", and "Linear Choke Shuttle/Office Check Valve Mechanism For A Twin Tower Air Dryer"; and is further closely related to the following copending patent applications: "E-1 Air Dryer Liquid Separator With Baffle", Ser. No. 08/978,796; "Control Valve With Axial Sealing", Ser. No. 08/978,551; "Shuttle Valve Mechanism For Twin Tower Air Dryer", Ser. No. 08/979,198; "E-1 Twin Tower Air Dryer For An Air Compressor Unit", Ser. No. 08/979,649; all of which are being filed concurrently herewith. All of the above-referenced patent and patent applications are assigned to the assignee of this invention. Additionally, the teachings of each of those issued and co-pending patent applications is incorporated herein by reference thereto.

FIELD OF THE INVENTION

The present invention generally relates to a new and improved air drying apparatus for inclusion within compressed air supply system. More particularly, the present invention pertains to a new and unique desiccant containing cartridge having a purge tube and a flapper valve for inclusion within a desiccant containing drying tower as utilized within a compressed air cleaning and drying system. The purge tube and flapper valve function to control ingress of purge air to concentrate such ingress at a location of highest moisture content to thereby maximize moisture removal from the desiccant material during the so-called purge mode of operation.

BACKGROUND OF THE INVENTION

It will be appreciated that a Westinghouse Air Brake Company C-1 air dryer is designed to remove moisture from compressed air for use in a compressed air system as utilized on railway trains, transit vehicles and the like, as necessary to operate the air brake system and air valves. U.S. Pat. No. 5,423,129, assigned to the assignee of this invention and cited above, discloses such a system wherein the compressed air is cleaned and dried by passing it through a regenerating system containing a desiccant material to absorb the moisture and filter-out particulate matter. The desiccant is regenerated by passing a small percentage of the dried air back therethrough which absorbs at least some of the moisture collected in the desiccant and is therefore discarded.

In operation, the above noted prior art air drying system (now referred to as the "single tower" system) receives compressed air from a conventional air compressor, a supply which typically contains an unacceptably high amount of moisture and other particulates suspended therein. This unpurified compressed air is caused to flow upwardly through a desiccant material usually in the form of a porous cartridge containing a porous desiccant media. The desiccant plays the key role within the single tower air drying system in that it absorbs the moisture and traps various particulates (e.g., dust, dirt, etc.) as the compressed air moves upwardly through the desiccant media. Once moisture and particulates are extracted from the air stream, the cleaned and dried compressed air continues flowing from the desiccant media through a purge check valve situated near the top of the tower. This purified compressed air then passes through a side chamber, a part of which eventually reaches a purge volume.

When the air compressor is cycled off, the system operates in a purge mode. During the purge mode, the purified pressurized air contained within the purge volume passes slowly in the reverse direction through a choke in a purge check valve and then back through the desiccant media. This slow stream of dried air reabsorbs a portion of the moisture previously collected within the desiccant media. Having evaporated into this passing stream of dry air, the evaporated moisture eventually exhausts through the sump volume to atmosphere. This gradual purging of dry air back through the system serves to dry out and thus rejuvenate or regenerate the desiccant media. When the air compressor is again cycled on, the tower system returns to operation in a drying mode, with the desiccant media then again removing moisture from the stream of unpurified compressed air passing therethrough.

More recently, a twin tower system has been proposed and developed in which a pair of desiccant containing chambers or towers are provided, each alternating back and forth between operation in drying mode and in recycle mode. Accordingly, at any given moment of operation, one tower is operating in air drying cycle while the other is operating in recycle mode or purge cycle. A pair of control valves are provided to automatically switch the flow to reverse these flow directions so that after a defined time period the cycles are reversed so that in effect a continuous operation is achieved with each tower alternately operating in drying mode permitting moisture to collect within the desiccant media while the other tower is in recycle mode removing the collected moisture from the desiccant material or media. This unique system obviously had a greater moisture removing capability and also avoids the need to have the source of unpurified air cycled-off in order to purge the desiccant material of the moisture it has accumulated, and thereby eliminate the need to temporarily deprive the pneumatic system of a steady supply of clean and dried compressed air while the compressor is turned off.

In addition to the above advantages, the switching of the two drying assemblies alternately between the drying and the purging modes allows the twin tower system to exsiccate the air stream more efficiently than the prior art single tower system. Two desiccant towers rather than one are employed in the air drying system with one absorbing moisture while the other is being purged of it. The switching of the two drying assemblies alternately between the drying and the purging modes thus serves to continuously purge moisture from the twin tower system. More fully desiccated air is thus supplied to the pneumatic system. The amount, density and overall surface area of the desiccant can also be selected to suit varying needs.

The twin tower system can be applied to a wide variety of pneumatic systems. Typical of the types of pneumatic systems to which the twin tower system could be applied include the pneumatic brake systems of passenger and freight railroad trains, subway trains and various other types of rail related transportation systems. Further examples include the pneumatic brake systems of various truck transport vehicles. Other types of pneumatic systems to which the twin tower system could be applied may be found outside the transportation field.

Another disadvantage of the single tower air drying system is that it is only capable of removing a certain, limited amount of moisture during the purge mode. Because the volume of unpurified air flowing into the system to be dried vastly exceeds the volume of purified air used to purge the desiccant media, the desiccant media never adequately exsiccates during operation of the single tower system. Indeed, the desiccant media adequately exsiccates only after the system has been turned off for a prolonged time sufficient to accomplish same. While the twin tower system has a greatly increased moisture removing capacity by permitting a continuous operation of both the drying cycle and the desiccant purging cycle, even the current twin tower system is not capable of completely removing the absorbed moisture from the desiccant media during the purge cycle. Specifically, it has been found that when the moist air is percolated upwardly through the desiccant media there is a tendency for the moisture to be concentrated adjacent to the bottom inlet end so that after a period of time the moisture is highly concentrated in the lower ⅓ portion of the desiccant media. In subsequently purging the desiccant media in a reverse directional flow, namely, from the top downward, moisture removal is commenced at the top of the desiccant media, so there may be little or no moisture removal from the area where moisture in most concentrated. Hence, there is a continuing tendency for the lower one-third of the desiccant body to retain most of the moisture collected during the drying mode. This tendency is enhanced by gravitational forces which cause moisture in the upper ⅓ portion of the media to flow downwardly into the mid-portion, and the moisture in the mid-portion to flow downwardly into the lower ⅓ portion. The end result is that during any such purge cycle moisture is removed primarily from the upper ⅔ portion of the desiccant media, with very little, or even no, moisture removal from the lower ⅓ portion. Hence after several cycles of operation, the lower ⅓ portion of the media virtually becomes saturated with moisture and remains so saturated, so that only the upper portion of the desiccant media can function to remove moisture during the air drying cycle as intended, and of course, the media's water removing capacity progressively diminishes with a progressive increase in water saturated desiccant.

SUMMARY OF THE INVENTION

This invention is predicated upon our conception and development of a new and improved desiccant containing cavity having a purge tube and a spring biased flapper valve associated therewith which is designed to control the ingress of dry purge air or gas through the desiccant media so that its ingress is concentrated at the lower ⅓ portion of the media where it can be more effective in removing moisture from the media and can in fact reduce the moisture content throughout the entire body of media thereby preventing the tendency for the lower ⅓ portion of the media from becoming and staying saturated throughout a prolonged operation. The net result being that the entire system is far more effective in removing moisture during the desiccant purge cycle.

In essence, therefor, the unique and novel apparatus of this invention includes a cavity or a cartridge containing a desiccant media and having a pair of opposed porous wall members, the cavity or cartridge, pursuant to prior art practices, is adapted to firstly function in a gas drying cycle in which a moist gas or air is permitted to ingress through a first of the porous wall members, pass through the desiccant media whereby at least a portion of the moisture is removed from said air or gas, with the dried air or gas then egressing through a second of the porous wall members. In addition, the cavity or cartridge is further adapted to secondly function in a desiccant purge cycle in which a portion of the dried air or gas is allowed to pass back through the desiccant media to absorb moisture therefrom thereby at least partially regenerating the desiccant media. The inventive feature of the invention includes a purge tube extending partially through the desiccant media, a first or upper end of which is adjacent to the second porous wall member and a second or lower end spaced upwardly from the first porous wall member by a distance of about ⅓ of the height of the desiccant media, with a one-way valve means (check valve) provided over the upper end of the purge tube adapted to close and restrict flow of air through the purge tube when the air or gas is flowing in the air or gas drying cycle and to open and promote air or gas flow through the purge tube when the air or gas is flowing in the desiccant purge cycle. The purge tube is preferably provided with a plurality of apertures through a wall thereof adjacent to a lower end thereof. The one-way valve means, i.e., check valve, is a preferably a flat rubber flapper valve over the upper end of the purge tube and the second porous wall member, and is adapted to restrict flow of air through the purge tube when air is flowing in the air drying cycle, and to overlay and thus block the second porous wall member and deflect the air into the purge tube when it is flowing is the desiccant purge cycle so as to divert at least a majority of the dried air or gas through the purge tube during the purge cycle.

OBJECTS OF THE INVENTION

It is, therefore, a primary object of the present invention to provide a new and improved system for removing moisture from a compressed gas such as compressed air.

It is another object of this invention to provide a new and improved desiccant cavity or cartridge for use in a desiccant tower type of air cleaning and drying system, whether a single tower or twin tower system, which does a superior job of drying moisture from the desiccant media during the recycle, desiccant purge cycle.

It is still another object of this invention to provide a new and improved desiccant cavity or cartridge for use in a desiccant tower type of air cleaning and drying system, whether a single tower or twin tower system, in which a purge tube is provided to admit the recycle dried air into the desiccant media at a location where the moisture content is the greatest, the purge tube provided with a one-way valve means adapted to close and restrict flow of air through the purge tube when the air is flowing in the air drying cycle and to open and promote air flow through the purge tube when the air is flowing in the desiccant purge cycle.

It is an even further object of this invention to provide a new and improved desiccant cavity or cartridge for use in a desiccant tower type of air cleaning and drying system, whether a single tower or twin tower system, in which the recycle dried air is admitted into the desiccant media at a location where the moisture content is the greatest, namely at a level approximately ⅓ of the way upward from the bottom of the desiccant media.

In addition to the above-described objects and advantages of the air drying system of this invention, various other objects and advantages of the present invention will become more readily apparent to those persons who are skilled in the same and related arts from the following more detailed description of the invention, particularly, when such description is taken in conjunction with the attached drawing figures and the appended claims.

DETAILED DESCRIPTION OF A PREFERRED EMBODIMENTS OF THE INVENTION

Figure 1:
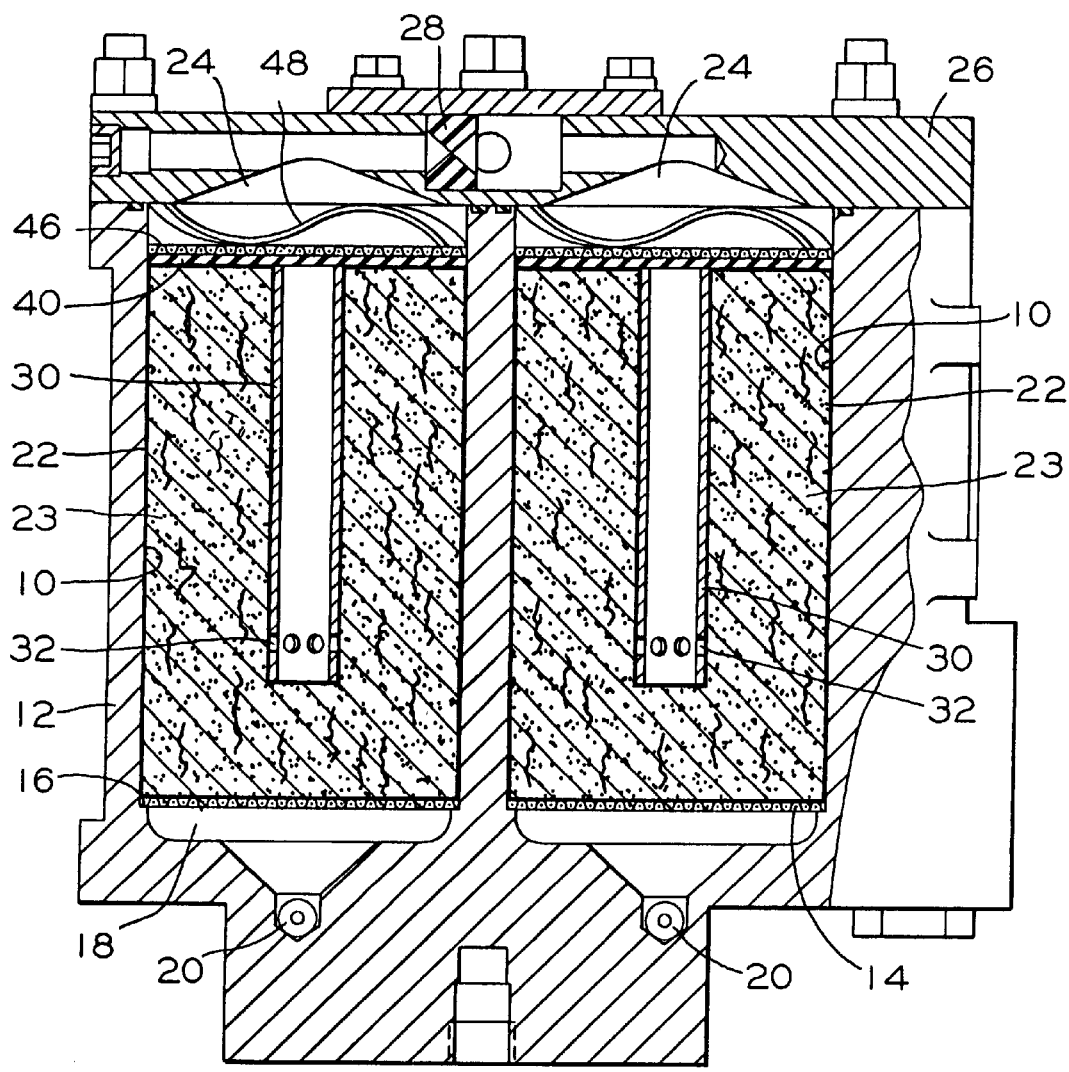
FIG. 1 is a cross-sectional side view through a twin tower air drying system incorporating a pair of desiccant containing chambers each having a purge tube and rubber flapper valve pursuant to a presently preferred embodiment of this invention.
Figure 2:
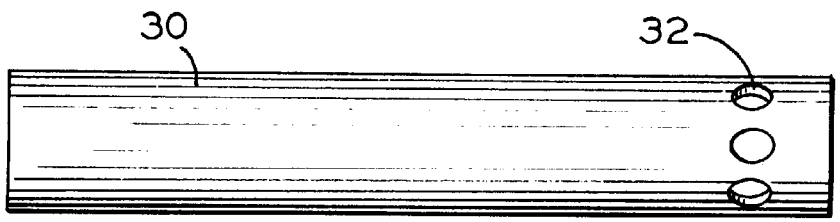
FIG. 2 is a side view of the purge tubes shown in FIG. 1.

Before describing the present invention in detail, it is noted that for the sake of clarity and understanding, identical components having identical functions in each of the accompanying drawings have been marked with the same reference numerals throughout each of the several Figures illustrated herein.

Reference to FIGS. 1 will illustrate a presently preferred embodiment of a desiccant cavity 10 of this invention wherein two such cavities 10 are shown in a side-by-side relationship as is common in the above-mentioned twin tower system. As shown, the cavities 10 are cylindrical in form and essentially identical and side-by-side within a cast housing member 12. Each cavity 10 is provided with a circular, porous support member 14, such as a screen or the like, resting on a circular protruding flange 16 near the bottom of the cavity 10, thereby providing an inlet chamber 18 in the lower portion of the cavity 10 under the support member 14. An inlet ports 20 at the base of each inlet chamber 18 is connected to a control valve (not shown) through which compressed air emerging from a centrifugal separator (not shown) can be admitted into the bottom of the cavity 10 via one of the ports 20 and the inlet chamber 18 connected thereto. Compressed air from the centrifugal separator (not shown) is routed past two such control valves (not shown), each one capable of being opened to admit the compressed air into just ones of the cavities 10, while the other control valve is closed so that the other cavity 10 will be in the desiccant purge cycle.

A desiccant containing cartridge 22 is disposed within each cavity 10 and supported on top of porous support member 14. The top or each chamber 10 is provided with an outlet chamber 24 above the upper surface of desiccant containing cartridge 22. Outlet chambers 24 are formed in part by the undersurface of a cover member 26 attached over the two cavities 10, with the cover member 26 also including a shuttle valve mechanism 28, adapted to pass the dried compressed air emerging from that cavity 10 (the one functioning in the air drying cycle) to the system for further use. At the same time, the shuttle valve mechanism 28 will permit a small portion of the dried compressed air to be admitted into the top of the other cavity 10 via its outlet chamber 24 so that this limited volume of dry compressed air will move downwardly through that other cavity 10 and the desiccant therein for effecting the desiccant purge cycle within that other chamber 10. Accordingly, the air from the centrifugal separator (not shown) is passed upwardly through just one of the desiccant containing chambers 10 via one of the control valves (not shown) which is opened for that purpose to effect the air cleaning and drying cycle within that one desiccant containing chamber 10. Concurrently, the shuttle valve mechanism 28 will direct a portion of dried air exiting from that one chamber 10 to the top of other chamber 10 for effecting the desiccant purge cycle whereby the dried air passes downwardly through that other chamber to remove moisture from the desiccant therein. The other of the two control valves will then exhaust that recycle air containing the re-absorbed moisture to atmosphere. A timer (not shown) is provided to periodically change the two control valves (not shown) so that the two cycles are reversed at periodic intervals.

One each cartridge 22, containing a particulate desiccant 23, is inserted within the two cavities 10, each resting upon a porous support member 12 and as necessary to providing an outlet chamber 24 within the cavity 10 above the cartridge 22. Accordingly, each chamber 10 is adapted to function in the air drying cycle whereby the air to be dried is admitted into inlet chamber 18, pass upwardly through the desiccant media 23 and exit via outlet chamber 24. Pursuant to this invention, a purge tube 30 is disposed within the desiccant media 23 aligned in the direction of air flow therethrough such that the top of purge tube 30 is level with the upper surface of the desiccant media 23 and thus open to outlet chamber 24. The lower end of the purge tube 30 is spaced approximately ⅔ of the distance downward from the upper surface of the desiccant media 23 with the base thereof spaced upwardly from support member 12. Accordingly, purge tube 30 should preferably extend vertically through the upper ⅔ portion of the desiccant media 23 with its upper end open to the to the outlet chamber 24 and its lower end open to the mass of desiccant media 23 and spaced the remaining ⅓ distance above the base or porous support member 12. Preferably, purge tube 30 is provided with a plurality of apertures 32 (6 as shown) equally spaced around the cylindrical wall spaced just upward from the open lower end thereof.

Figure 6:
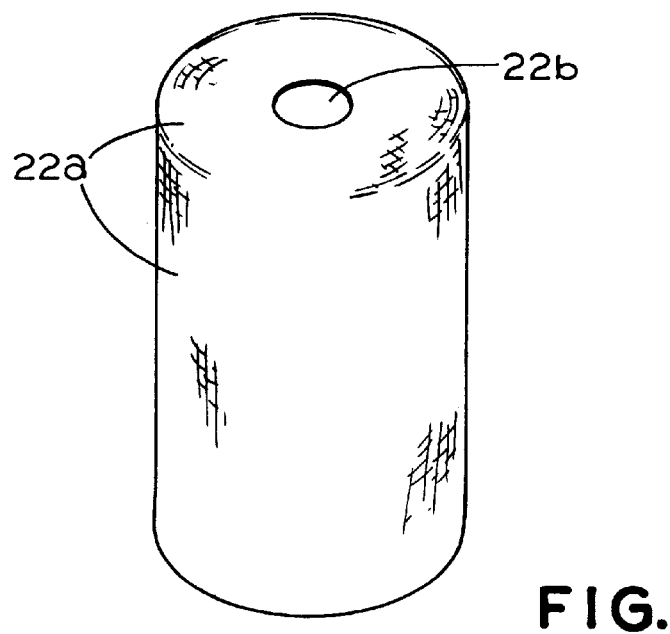
FIG. 6 is an isometric view of a desiccant containing fabric bag which can function as a preferred embodiment of the desiccant containing cartridge of this invention.

While the cartridges 22 can take any of a number of different forms, a preferred embodiment thereof, as shown in FIG. 6, is the use of a porous cylindrical fabric bag 22a having a smaller cylindrical recess 22b at the axis in the upper surface of the fabric bag 22a, and having a size and configuration adapted to snugly receive the purge tube 30. Obviously, the particulate desiccant media 23 is contained within fabric bag 22a. Ideally, the fabric bag 22a should be completely filled with the desiccant media 23 and of such size and configuration as to snugly fit within the cavity 10 to avoid any open spaces therearound through which air could pass without passing through the desiccant media 23. In a like manner, the purge tube 30 should snuggle fit within the opening 22b to avoid any open spaces through which air could by-pass either the desiccant media 23 or the purge tube 30. Accordingly any compressed air entering into the cavities 10 via either inlet chamber 18 or outlet chamber 24 will be free pass either upwardly of downwardly, depending on the direction of flow, through the desiccant media 23 as well as through purge tube 20.

Figure 3:
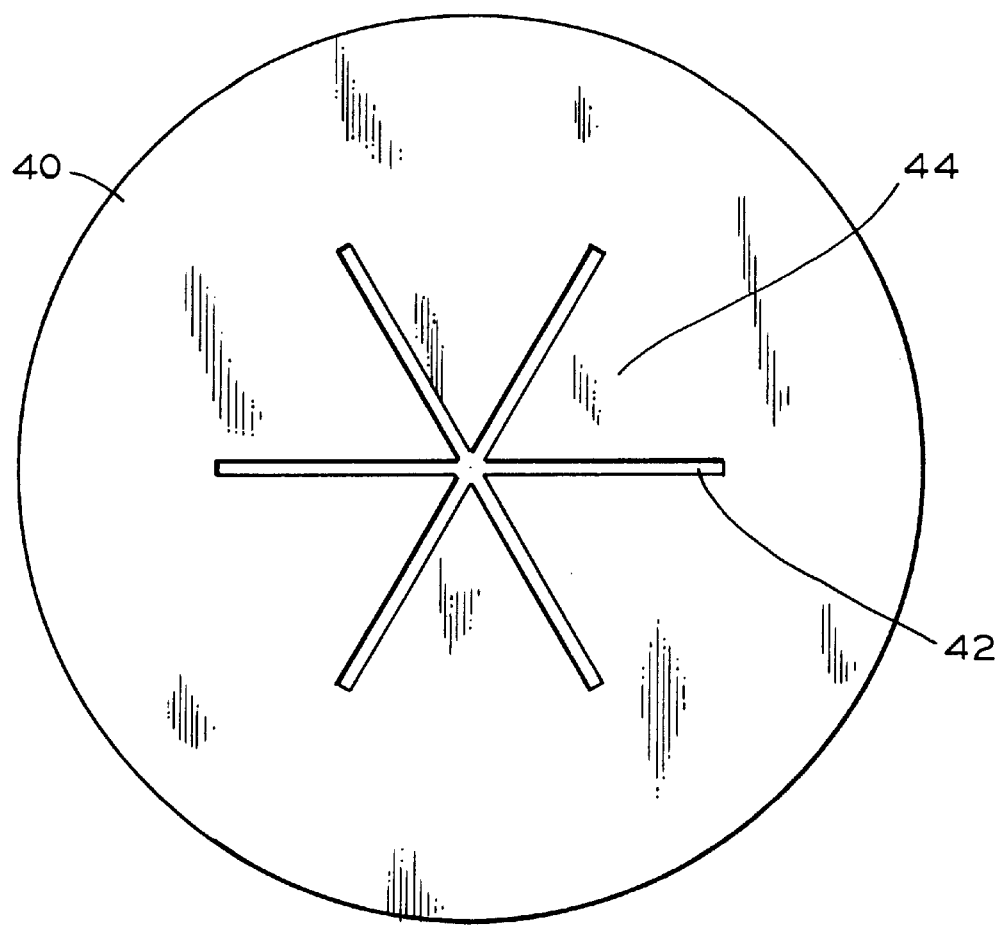
FIG. 3 is a plan view of the rubber flapper valves shown in FIG. 1.
Figure 4:
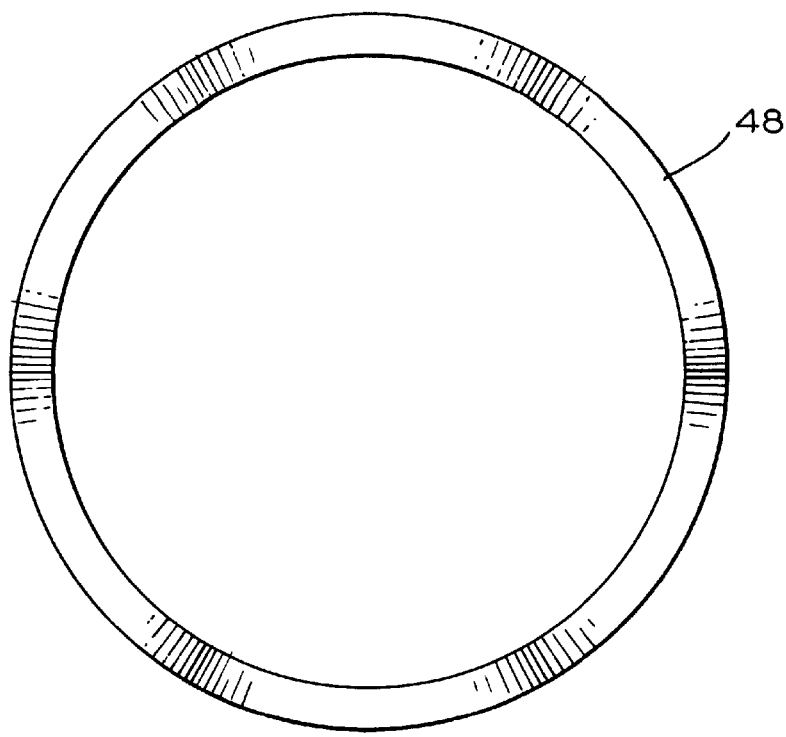
FIG. 4 is a plan view of the wave spring shown if FIG. 1.
Figure 5:
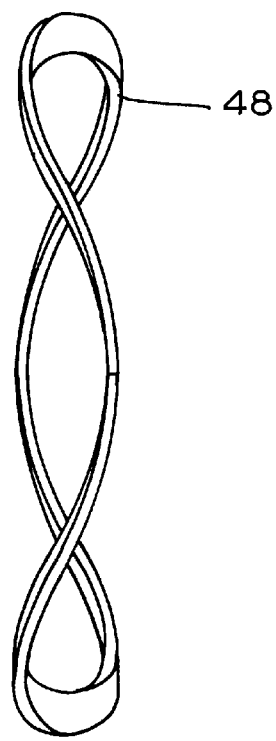
FIG. 5 is a side view of the wave spring shown on FIG. 4.

A circular disk shaped flapper valve 40 (FIG. 3) having a diameter to match that of the desiccant containing cartridge 20, is disposed onto the upper surface of each cartridge 22 (or bag 22a) As shown in FIG. 3, flapper valve 40, preferably made of sheet rubber, is adapted to overlay and cover the annular, porous upper surface of cartridge 22 (bag 22a) as well as overlay the upper opening into purge tube 30. Flapper valve 40 is further provided with a plurality of diametric slots or cuts 42 intersecting at the axis of the circular form (as shown in FIG. 3), so that a plurality of pie-shaped portions 44 of the flapper valve 40 point to each other across the axis, with the outer ends of pie-shaped portions 44 joined together at the circular perimeter of flapper valve 40. Accordingly, the pie-shaped portions 44 are adapted to deflect inwardly or outwardly at the axis of flapper valve 40, while the base ends thereof at the perimeter of flapper valve 40 do not deflect. A circular screen member 46 is disposed on top of flapper valve 40, while a circular wave spring 48 (FIGS. 4 and 5) is disposed thereover.

In operation, compressed air from a conventional compressor (not shown) is firstly routed through a centrifugal separator (not shown) wherein a significant amount of moisture is removed from the compressed air. From the centrifugal separator, the compressed air may be still rather moist and is routed past the two control valves (not shown), only one of which will be open to permit the compressed air through one of the inlet ports 20 where it passes into the associated inlet chamber 18 and from there is allowed to pass upwardly through the desiccant media 23 within cartridge 22 (or bag 22a) within one of the chambers 10. Due to the upward flow forces, the flapper valve 40 will attempt to deflect the flow of compressed air, but cannot because the screen member 46 is in the way, preventing any significant deflection of pie-shaped portions 44. Accordingly, the shape of flapper valve 40 reaming substantially flat, thereby restricting the flow of compressed air upward through purge tube 30, so that the greater mass of compressed air is forced to pass through the desiccant media 23 within cartridge 20, whereby the desiccant media 23 will function as intended to remove moisture therefrom. As should be apparent, the upward flow of compressed air will readily flow into outlet chamber 24 as the pressure thereof will be able to lift and deform flapper valve 40, at least to the extent necessary to get therepast. While flapper valve 40 will not function to prevent the flow of any compressed air upwardly through purge tube 30, the relatively flat nature thereof as maintained by screen member 46 will restrict and limit such upward flow through purge tube 30 from what might otherwise be normal, so that in essence a majority of the compressed air is caused to flow upwardly through the desiccant media 23. The wave spring 48, will function to keep flapper valve 40 biased against the upper surface of cartridge 22 and to help maintain the flat shape of the flapper valve 40.

When either of the cavities 10 are functioning in the desiccant purge cycle, however, the flow of compressed air therethrough is in the reverse direction, so that the dry, purge air is admitted into outlet chamber 24 (which now becomes an inlet chamber). From there the dry air is forced downwardly through the desiccant media 23 to remove moisture therefrom. This directional flow will cause an increase in pressure within outlet cavity 24 thereby biasing flapper valve 40 downward against the upper surface of desiccant containing cartridge 22 (or bag 22A) which blocks much of that dry air from entering directly into the cartridge 22 through the porous upper surface. The downward flow of compressed, dry air within outlet chamber 24, however, will force the pie shaped portions 44 of flapper valve 40 to be deflected into the upper open end of purge tube 30, so that the great majority of the compressed, dry air, instead of entering into cartridge 22 through the porous upper surface, will enter into purge tube 30 and move downwardly therethrough. Therefore, this mass of compressed, dry air will not enter directly into the mass of desiccant media 23 except as it exits the lower end of purge tube 30 where the moisture content of the desiccant media 23 is concentrated. Clearly, the flapper valve 40 does not provide an air-tight seal to the reverse flow of compressed, dry air, as air can by-pass the flapper valve 40 through the slots 42 and around the peripheral edge. Nevertheless, flapper valve 40 will function to direct a significant majority of the reverse flowing dry air downwardly through the purge tube 30, as opposed to through the upper mass of desiccant media 23, to thereby promote and commence moisture removal from the desiccant media 23 at a location approximately ⅔ of the distance downwardly from the upper surface of the desiccant media 23, where the water content is concentrated. During the air drying cycle, on the other hand, when the compressed, moist air is moving upwardly, hopefully through the desiccant media 23 so that the desiccant media will extract moisture therefrom, flapper valve 40 again does not form an air tight seal, but by maintaining its relatively flat configuration, it does restrict the upward flow of compressed air through the purge tube 30, so that at least a majority of it will pass upwardly through the desiccant media 23.

Having disclosed one embodiment of this invention, it should be apparent that a number of different embodiments and modifications could be devised and incorporated without departing from the spirit of the invention. For example, the purge tube could take different forms or a plurality of purge tubes could be utilized if desired. Obviously too, the flapper valve could take different forms provided any such check valve is in essence a one-way valve designed to restrict or limit the upward flow of air or gas through the purge tube 30 during the gas drying cycle, and to enhance and promote the downward flow of gas through the purge tube 30 during the desiccant purge cycle. For example, a floating ball within the cylindrical purge tube 30 could be designed to function in a similar fashion. That is, the upward flow of moist gas or air could close the floating ball against a circular seal at the upper end of the tube, while the downward flow of dry air or gas could force the ball downward sufficient to expose lateral apertures in the tube where it is desired to permit ingress of the dry air or gas for better effecting the purge cycle.

We claim:

1. Gas drying apparatus for use in a compressed gas drying system comprising:
    (a) a cartridge containing a desiccant media and having a pair of opposed porous wall members, said cartridge adapted to firstly function in a gas drying cycle in which a moist gas is permitted to ingress through a first of said porous wall members, pass through said desiccant media whereby at least a portion of the moisture is removed from said gas, with the dried gas then egressing through a second of said porous wall members; said cartridge further adapted to secondly function in a desiccant purge cycle in which a portion of said dried gas is allowed to pass back through said desiccant media to absorb moisture therefrom thereby at least partially regenerating said desiccant media;
    (b) a purge tube extending partially through said desiccant media, a first end of which is adjacent to said second porous wall member and a second end spaced from said first porous wall member; and
    (c) a one-way valve means adjacent to said first end of said purge tube adapted to close and restrict flow of gas through said purge tube when said gas is flowing in said gas drying cycle and to open and promote gas flow through said purge tube when said gas is flowing in said desiccant purge cycle.

2. Gas drying apparatus for use in a gas drying system, according to claim 1, in which said purge tube extends through approximately a ⅔ length of said desiccant media.

3. Gas drying apparatus for use in a gas drying system, according to claim 2, in which said purge tube is provided with a plurality of apertures through a wall thereof adjacent to said second end of said purge tube.

4. Gas drying apparatus for use in a gas drying system, according to claim 1, in which said one-way valve means comprises a flat rubber flapper valve adjacent to said first end of said purge tube and said second porous wall member, and is adapted to restrict flow of gas through said purge tube when gas is flowing in said gas drying cycle, and to overlay and thus block said second porous wall member and deflect flowing gas into said purge tube when gas is flowing is said desiccant purge cycle so as to divert at least a majority of said dried gas through said purge tube during said purge cycle.

5. Gas drying apparatus for use in a gas drying system, according to claim 4, in which said flat rubber flapper valve is generally circular in form having a plurality of diametric cuts therethrough intersecting at an axis of said circular form to provide a plurality of pie-shaped portion joined at the periphery of said valve, said plurality of pie-shaped portions adapted to be deflected into said purge tube when gas is flowing in said desiccant purge cycle.

6. Gas drying apparatus for use in a gas drying system, according to claim 5, further including a screen member disposed over said flat rubber flapper valve adapted to maintain the generally flat configuration of said flapper valve and restrict the flow of gas through said purge tube when gas is flowing in said gas drying cycle.

7. Gas drying apparatus for use in a gas drying system, according to claim 6, further including a wave spring disposed over said screen member adapted to generally maintain said flapper valve and said screen member biased against said upper porous wall member.

8. Gas drying apparatus for use in a compressed gas drying system comprising:
(a) a cylindrical cartridge containing a particulate desiccant media and having a porous wall members at each cylindrical end, said cartridge adapted to firstly function in a gas drying cycle in which a moist gas is permitted to ingress through a lower of said porous wall members, percolate upwardly through said desiccant media whereby at least a portion of the moisture is removed from said gas, with the dried gas then egressing through an upper of said porous wall members; said cartridge further adapted to secondly function in a purge cycle in which a portion of said dried gas is allowed to percolate back through said desiccant media to absorb moisture therefrom thereby at least partially regenerating said desiccant media;
(b) a purge tube extending partially through said desiccant media, a first end of which is adjacent to said second porous wall member and a second end spaced from said first porous wall member; and
(c) a rubber flapper valve adjacent to said upper porous wall member adapted to restrict flow of gas through said purge tube when gas is flowing in said gas drying cycle, and further adapted to overlay said upper porous wall member and open into said purge tube when gas is flowing is said desiccant purge cycle to thereby divert at least a majority of said dried gas through said purge tube during said desiccant purge cycle.

9. A gas drying apparatus for use in a gas drying system, according to claim 8, in which said purge tube is cylindrical in form and disposed at the axial center of said drying cartridge.

10. A gas drying apparatus for use in a gas drying system, according to claim 9, in which said purge tube is provided with a plurality of apertures through a cylindrical wall thereof adjacent to said a lower end thereof such that said dried gas can enter radially into said desiccant media adjacent to the lower end of said purge tube during said desiccant purge cycle.

11. A gas drying apparatus for use in a gas drying system, according to claim 9, in which said flapper valve is fabricated of sheet rubber having a flat annular form adapted to overlay both said second porous wall member and said first end of said purge tube such that when gas is flowing is said desiccant purge cycle, said flapper valve will overlay and block passage of gas directly into said desiccant through said second porous wall member, and will be deflected into said purge tube thereby promoting passage of gas into said purge tube.

12. Gas drying apparatus for use in a gas drying system, according to claim 11, further including a screen member disposed over said flat rubber flapper valve adapted to maintain the generally flat configuration of said flapper valve and restrict the flow of gas through said purge tube when gas is flowing in said gas drying cycle.

13. Gas drying apparatus for use in a gas drying system, according to claim 12, further including a wave spring disposed over said screen member adapted to generally maintain said flapper valve and said screen member biased against said upper porous wall member.

14. Air cleaning and drying apparatus for use in a compressed air drying system comprising:
(a) a vertically disposed cylindrical cartridge containing a particulate desiccant media and having a porous wall members at each cylindrical end, said cartridge adapted to firstly function in an air cleaning and drying cycle in which a moist air is permitted to ingress through a lower of said porous wall members, pass upwardly through said desiccant media whereby the air is filtered and at least a portion of the moisture is removed from said air, with the cleaned and dried air then egressing through an upper of said porous wall members; said cartridge further adapted to secondly function in a desiccant purge cycle in which a portion of said dried air is allowed to pass back through said desiccant media to absorb moisture therefrom thereby at least partially regenerating said desiccant media;
(b) a cylindrical purge tube extending vertically through an axis of said desiccant media, the upper end of which is adjacent to said upper porous wall member and the lower end of which is approximately ⅔ the distance to said lower porous wall member;
(c) a circular flapper valve adapted to overlay said upper porous wall member and an upper end of said purge tube,
said flapper valve adapted to overlay said second porous wall member to restrict the flow of air directly into said desiccant media via said second porous wall member when air is flowing is said desiccant purge cycle;
said flapper valve having a plurality of diametric cuts therethrough intersecting at an axis thereof to provide a plurality of pie-shaped portion joined at the periphery, said pie-shaped portions adapted to be deflectable into said purge tube to promote the flow of air through said purge tube when air is flowing is said desiccant purge cycle;
(d) a circular screen disposed over said circular flapper valve adapted to maintain the generally flat configuration of said flapper valve and restrict the flow of air through said purge tube when air is flowing in said air cleaning and drying cycle; and
(e) a wave spring disposed over said circular screen adapted to generally maintain said flapper valve and said circular screen biased against said upper porous wall member.

15. Gas drying apparatus for use in a compressed gas drying system, according to claim 14, in which said purge tube is provided with a plurality of apertures through a cylindrical wall adjacent to said lower end.

16. In a desiccant media containing cartridge for use in a gas drying apparatus adapted to firstly function in a gas drying cycle in which a moist gas is permitted to pass upwardly through said desiccant media whereby at least a portion of the moisture is removed from said gas, and adapted to secondly function in a desiccant media purge cycle in which a portion of said dried gas is allowed to pass back downwardly through said desiccant media to absorb moisture therefrom thereby at least partially regenerating said desiccant media; a means for concentrating the desiccant purge cycle at the bottom of the desiccant media, said means comprising:

(a) a purge tube extending vertically partially through said desiccant media; and (b) a flapper valve adjacent to an upper end of said purge tube adapted to close and restrict flow of gas through said purge tube when said gas is flowing upwardly in said gas drying cycle and to open and promote gas flow through said purge tube when said gas is flowing downwardly in said desiccant purge cycle.

17. A desiccant media containing cartridge, according to claim 16, in which said purge tube extends through approximately a ⅔ length of said desiccant media.

18. A desiccant media containing cartridge, according to claim 17, in which said purge tube is provided with a plurality of apertures through a wall thereof adjacent to a lower end thereof.

19. A desiccant media containing cartridge, according to claim 16, in which said flapper valve comprises a flat rubber flapper valve adjacent to an upper end of said purge tube and is adapted to restrict flow of gas through said purge tube when gas is flowing in said gas drying cycle, and to overlay and thus block access to said desiccant media deflecting flowing gas into said purge tube when gas is flowing is said desiccant purge cycle.

20. A desiccant media containing cartridge, according to claim 19, in which said flat rubber flapper valve is generally circular in form having a plurality of diametric cuts therethrough intersecting at an axis of said circular form to provide a plurality of pie-shaped portion joined at the periphery of said valve, said plurality of pie-shaped portions adapted to be deflected into said purge tube when gas is flowing in said desiccant purge cycle.

* * * * *